United States Patent [19]
Rolfe

[11] 4,172,585
[45] Oct. 30, 1979

[54] VALVE DISK AND HOLDER ASSEMBLY AND VALVE INCORPORATING IT

[75] Inventor: Alfred H. Rolfe, Pottersville, N.J.

[73] Assignee: Automatic Switch Company, Florham Park, N.J.

[21] Appl. No.: 889,302

[22] Filed: Mar. 23, 1978

[51] Int. Cl.² .......................................... F16K 25/00
[52] U.S. Cl. .................................. 251/357; 251/175; 251/30
[58] Field of Search .................... 251/30, 45, 46, 357, 251/358, 356, 175

[56] References Cited
U.S. PATENT DOCUMENTS

| | | | |
|---|---|---|---|
| 628,786 | 7/1899 | Frishmuth | 251/357 |
| 2,347,210 | 4/1944 | Meeker | 251/357 |
| 2,708,092 | 5/1955 | Smith | 251/45 |
| 2,914,086 | 11/1959 | Beller | 251/44 |
| 3,544,062 | 12/1970 | Murray | 251/30 |
| 3,765,643 | 10/1973 | DeLaGarza | 251/44 |
| 3,905,689 | 9/1975 | Mylander | 251/357 |

FOREIGN PATENT DOCUMENTS

| | | | |
|---|---|---|---|
| 1206672 | 2/1960 | France | 251/30 |
| 837066 | 6/1960 | United Kingdom | 251/46 |

*Primary Examiner*—Martin P. Schwadron
*Assistant Examiner*—G. L. Walton
*Attorney, Agent, or Firm*—Alan H. Levine

[57] ABSTRACT

A valve disk assembly comprising an inverted cup-like holder accommodating a resilient disk, and being devoid of any fastening means for retaining the disk in the holder. The disk has a hole extending between its faces through which the region between the disk and the top wall of the holder communicates unobstructedly with the low pressure region surrounded by the valve seat when the disk is seated on the valve seat to close the valve. Sealing means, which may be a peripheral lip carried by the disk, restricts flow of high pressure fluid from beneath the disk into the region between the disk and holder. The top wall of the holder may be imperforate or have a hole aligned with the hole in the disk, depending upon the type of valve with which the disk assembly is used.

7 Claims, 11 Drawing Figures

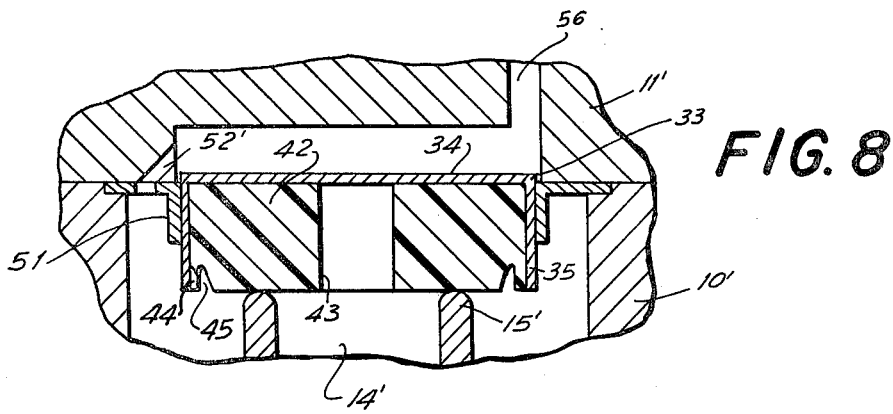
FIG. 8
FIG. 7
PRIOR ART
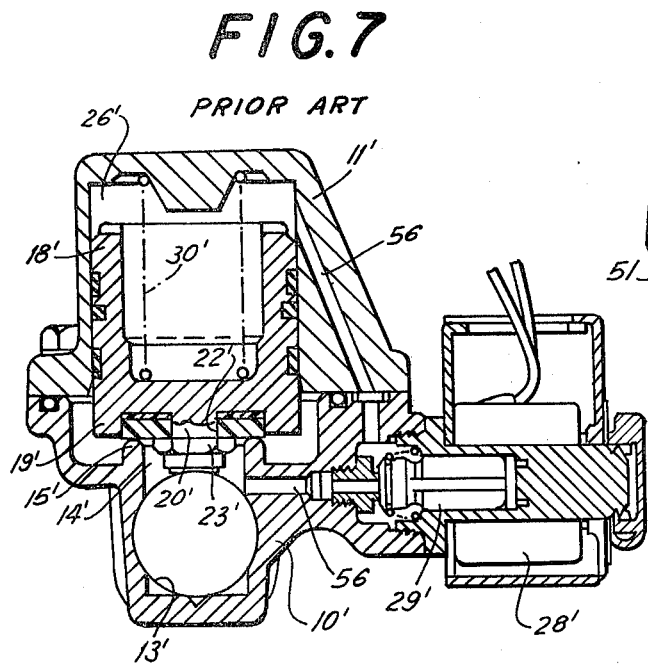
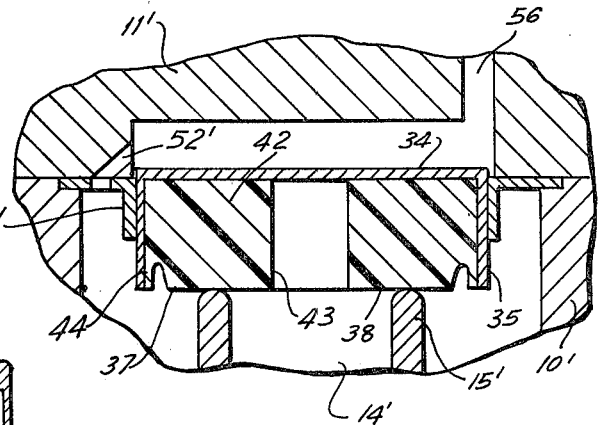
FIG. 9
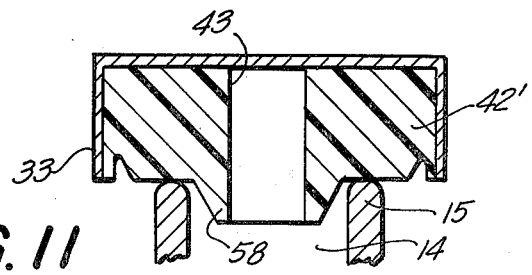
FIG. 11
FIG. 10
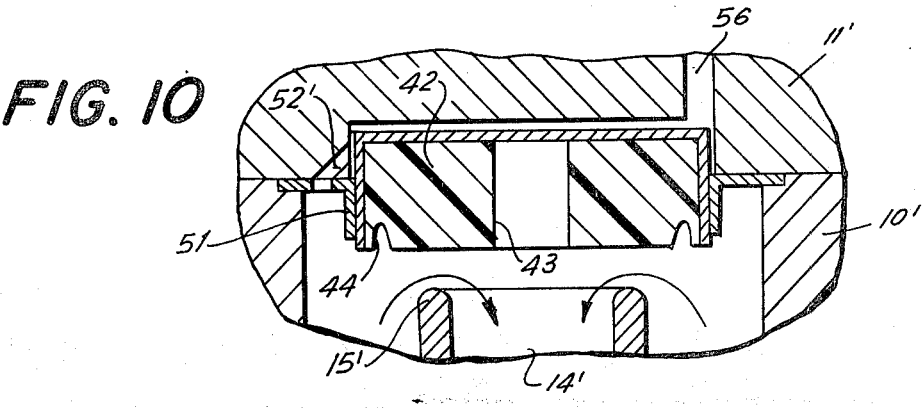

VALVE DISK AND HOLDER ASSEMBLY AND VALVE INCORPORATING IT

This invention relates to valves, and more particularly to the valve disk and holder assembly which moves into and out of engagement with the valve seat of a valve in order to close and open, respectively, the valve orifice.

The invention has particular utility in pilot-operated valves wherein the valve member is in the form of a piston. However, the valve disk and holder assembly may be useful in any type of valve in which high pressure fluid exists above the valve seat when the valve is closed, and the valve disk rises away from the seat to open the valve.

In piston valves, a resilient disk is carried at the lower end of a holder in the form of a piston, the disk engaging the valve seat of the valve when the piston is lowered to close the valve, and the disk lifting off the valve seat when the piston is raised to open the valve. When the valve is closed, high pressure exists above the piston and outwardly of the valve seat, and low pressure exists within the orifice surrounded by the valve seat. Consequently, at the moment the piston is being lifted away from the seat, there is a tendency for the resilient disk to be sucked downwardly into the orifice. This tendency is overcome, in conventional valves, by firmly fastening the disk to the piston, such as by means of a threaded fastener. In some situations, it is difficult to securely join the disk and piston, and in all cases the fastening means used must be sturdy enough to resist the downward pull on the disk without becoming distorted. Such sturdy fasteners add expense to manufacturing the valves, because of their own cost and the cost of assembling them with the other parts of the valve disk assembly. Moreover, the fasteners add weight to the valve disk assemblies, thereby requiring more power to open the valves, and hence increasing their cost of operation.

It is an object of the present invention to overcome these problems by providing a valve disk and holder assembly requiring no fastening means of any kind for joining the disk and holder together.

It is another object of the invention to provide a valve disk and holder assembly lighter in weight than a comparable conventional disk and holder assembly.

It is a further object of the invention to provide a valve disk and holder assembly which can be assembled from its constituent parts more quickly and easily than the parts of conventional disk and holder assemblies, and which facilitates changing a valve disk of one material for a disk made of a different material.

Additional objects and features of the invention will be apparent from the following description in which reference is made to the accompanying drawings.

In the drawings:

FIG. 7 is a cross-sectional view of a conventional pilot operated piston valve wherein the pilot passageway is formed in the valve body and not in the piston;

FIGS. 8-10 are fragmentary cross-sectional views of an alternative embodiment of a disk and holder assembly according to this invention within a valve of the type shown in FIG. 7, showing a sequence of positions as the valve opens; and FIG. 11 is a cross-sectional view of a disk and holder assembly, showing an alternative embodiment of the disk.

Figure 1:
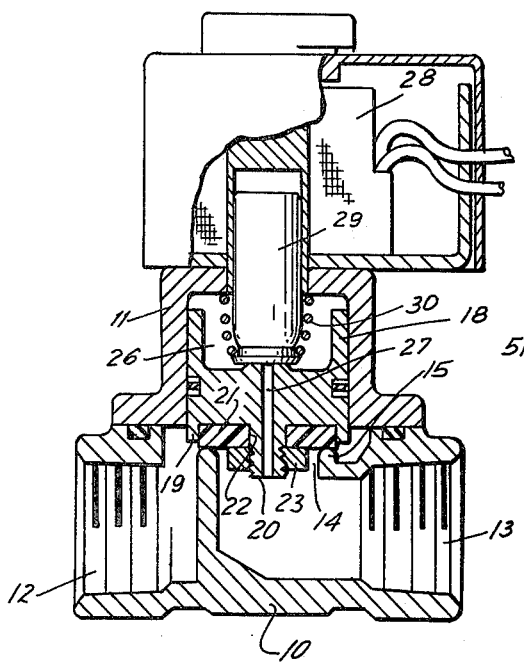
FIG. 1 is a cross-sectional view of a conventional pilot operated piston valve wherein the pilot passageway is formed in the piston.

The conventional valve shown in FIG. 1 comprises a valve body 10 surmounted by a bonnet 11. Body 10 has an inlet port 12 for connection to a source of high pressure fluid, an outlet port 13 for connection to a lower pressure region, and an orifice 14 between the ports 12 and 13 surrounded by an annular valve seat 15. Bonnet 11 is formed with an interior bore accommodating a piston 18 slidable vertically within the bore. The lower face of piston 18 has a downwardly projecting peripheral lip 19 and a central downwardly projecting threaded stud 20. A resilient annular valve disk 21, having a central hole 22, is accommodated within the annular recess defined between lip 19 and stud 20. Stud 20 passes through hole 22 in disk 21, and a nut 23 threaded on to stud 20 firmly secures the disk to piston 18. Disk 21 has an external diameter a little larger than the diameter of valve seat 15 so that when piston 18 is in its lowermost position, shown in FIG. 1, disk 21 engages seat 15 and closes the valve.

The region of the bore in bonnet 11 above piston 18 defines a chamber 26. A passageway 27 extends completely through piston 18 from chamber 26 to the orifice 14 and region beneath valve seat 15 open to outlet port 13. An electrical solenoid 28 is mounted on bonnet 11, and surrounds a vertically movable armature 29. When solenoid 28 is deenergized, a compression spring 30 holds armature 29 down, and a pilot valve member carried by the lower end of armature 29 seats upon piston 18 to close the upper end of passageway 27. High pressure fluid constantly seeps between piston 18 and the wall of the bore in bonnet 11 from inlet port 12 into chamber 26, so as to fill the chamber with high pressure fluid. Alternatively, a small diameter bleed passageway can be provided in bonnet 11 through which high pressure fluid continuously flows into chamber 26. As a result, a net downward force is applied to the piston which maintains the valve closed. When solenoid 28 is energized, armature 29 is lifted away from piston 18 so as to open passageway 27. The high pressure fluid in chamber 26 flows rapidly through passageway 27 to outlet port 13, thereby reducing the pressure in chamber 26. As a result, the net force on piston 18 is now in an upwardly direction, and piston 18 rises lifting disk 21 away from seat 15, thereby opening the valve. The valve remains open until solenoid 28 is deenergized, at which point the lower end of armature 29 again closes the upper end of passageway 27. This prevents further flow of fluid from chamber 26 to outlet port 13. Hence fluid pressure builds up in the chamber causing piston 18 to move downwardly until disk 21 engages seat 15 and closes the valve.

To aid in understanding the present invention, reference will now be made to FIGS. 2 and 3. FIG. 3 shows an inverted cup-like piston or holder 33 corresponding, for the purpose of this explanation, to piston 18 of FIG. 1. Holder 33 has a top wall 34 and a side wall 35. A resilient valve disk 36 fits within holder 33, the disk corresponding to disk 21 of FIG. 1. When the valve is closed, the bottom face of disk 36 engages valve seat 15 to close orifice 14. In this condition, high pressure fluid is applied to the entire top face of holder wall 34, and to the annular portion 37 of the bottom face of disk 36 radially outwardly of seat 15. The region 38 of the bottom face of disk 36 within seat 15 is exposed to low pressure. High pressure fluid seeps between disk 36 and side wall 35 of holder 33 into the space 39 between the disk and top wall 34 of the holder.

At the moment upward movement of the disk 36—holder 33 assembly is initiated, e.g., the moment solenoid 28 of FIG. 1 is energized, three conditions are present: (1) holder 33 is being lifted; (2) the high pressure fluid in space 39 is applying a downward force to the top face of disk 36; and (3) the region 38 of the bottom face of disk 36 is exposed to low pressure. As a result, disk 36 tends to belly downwardly, as indicated in broken lines in FIG. 3. In an extreme situation, disk 36 can be sucked out of holder 36 and into orifice 14. This tendency on the part of disk 36 to be sucked out of holder 33 is normally resisted by the cooperation of nut 23 and stud 20, or comparable fastening means. The present invention obviates the need for such fastening means.

Figure 2:
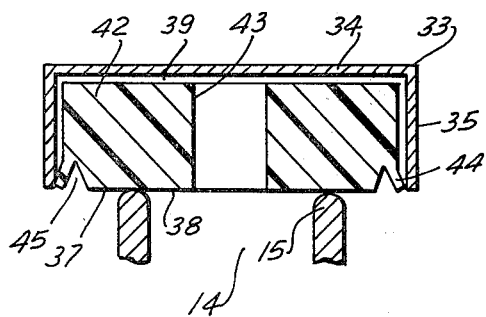
FIG. 2 is a cross-sectional view of a disk and holder assembly, on an enlarged scale, according to the present invention.
Figure 3:
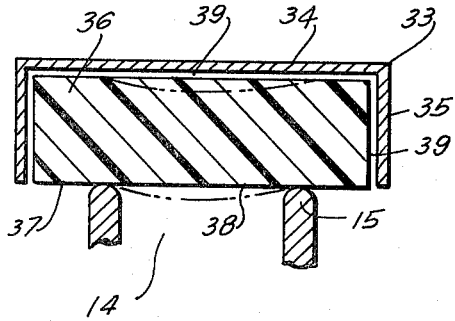
FIG. 3 is an explanatory view, similar to FIG. 2, of a disk and holder assembly.

FIG. 2 shows an assembly of a holder 33 and a resilient valve disk 42 according to the present invention. Disk 42 is furnished with a central hole 43 extending between its top and bottom faces, much like the hole 22 in disk 21 of FIG. 1. However, no stud 20 or other fastening means occupies hole 43 so that the hole provides unobstructed communication between space 39 and orifice 14. Furthermore, a sealing means is provided between disk 42 and side wall 35 of holder 33. In this example, the sealing means comprises a thin lip 44 extending continuously around the periphery of the bottom face of disk 42, the lip being defined by a continuous annular groove 45 in the bottom face of disk 42. High pressure fluid acting on the portion 37 of the bottom face of disk 42 presses lip 44 radially outwardly against the inner face of side wall 35, thereby restricting the flow of high pressure fluid between disk 42 and side wall 35 into space 39. Furthermore, any high pressure fluid which does reach space 39 immediately flows through hole 43 into the low pressure region of orifice 14. Thus, no fluid pressure ever builds up in space 39 to push disk 42 out of holder 33. Furthermore, since space 39 communicates freely with orifice 14 through hole 43, and space 39 is sealed from the region of high pressure by lips 44, the pressure in space 39 is low. Hence, with high fluid pressure acting on the bottom face of disk 42, the net force on the disk is in an upward direction, serving to hold the disk in the holder. Thus, no fastener of any type is needed to keep the disk and holder together.

It should be pointed out that in practice, nut 23 (FIG. 1) is tightened on stud 20 sufficiently to squeeze disk 21 between the nut and piston 18. An effective seal is thereby created between nut 23 and disk 21 for preventing flow of fluid from between the top wall of the disk and the piston into orifice 14. Thus, although disk 21 has a central hole 22, similar to that of hole 43 (FIG. 2) in disk 42, hole 22 cannot and does not serve the same function as hole 43.

Figure 4:
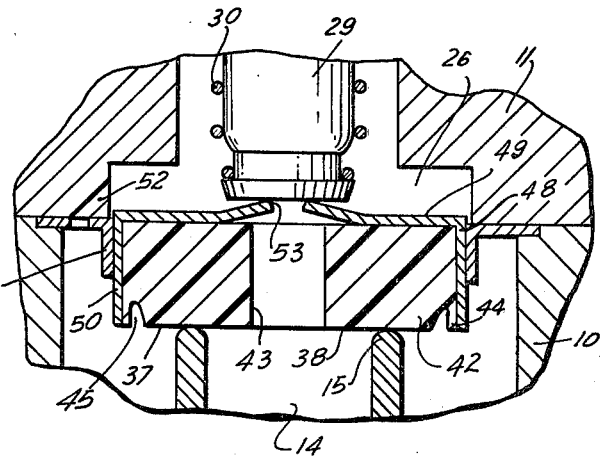
FIGS. 4-6 are fragmentary cross-sectional views of a disk and holder assembly according to this invention within a valve of the type shown in FIG. 1, showing a sequence of positions as the valve opens.
Figure 5:
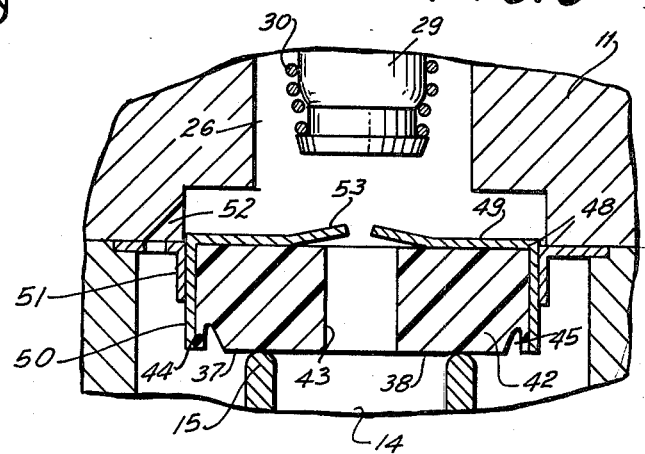
Figure 6:
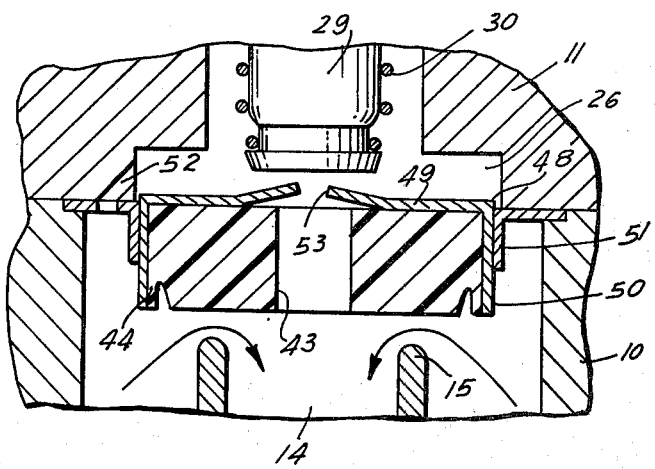

Part of a valve, similar to that of FIG. 1, incorporating a valve disk and holder assembly according to this invention is shown in FIGS. 4–6. An inverted cup-shaped holder 48, having a top wall 49 and a continuous side wall 50, is slideable vertically within an annular guide and seal 51. A bleed passageway 52 in bonnet 11 continuously supplies chamber 26 with high pressure fluid. Top wall 49 of holder 48 is formed with a hole 53 in registry with hole 43 in resilient disk 42. Top wall 49 is deformed into a frustoconical shape around hole 53 so that the upper edge surrounding the hole defines a seat for cooperation with the pilot valve member carried by the lower end of armature 29. Thus, aligned holes 53 and 43 correspond to passageway 27 of FIG. 1.

In FIG. 4, the force of high pressure fluid in chamber 26 together with the force of spring 30 maintains disk 42 on seat 15 to close the valve. In FIG. 5, armature 29 has just been lifted, by energization of solenoid 28, allowing the high pressure fluid in chamber 26 to flow through holes 53 and 43 to the outlet port. As described above with reference to FIG. 2, seal 44 restricts flow of high pressure fluid into the region between disk 42 and top wall 49; any such high pressure fluid which should find its way into that region flows through hole 43 to the low pressure region beneath orifice 14. Consequently, as holder 48 rises, disk 42 rises with it, as shown in FIG. 6, even though no fasteners join the holder and disk together. In fact, due to the high pressure acting on annular disk portion 37, the disk actually lifts the holder rather than the holder lifting the disk.

FIG. 7 shows another type of conventional valve, the parts of this valve corresponding to those of FIG. 1 bearing the same reference numerals followed by a prime. In the valve of FIG. 7, piston 18' does not have a pilot passageway such as passageway 27 of FIG. 1. Instead, the pilot passageway 56 comprises a passageway in bonnet 11' extending from chamber 26', and a passageway in body 10' terminating at outlet port 13'. The passageway 56 in body 10' includes a pilot valve chamber containing a solenoid operated pilot valve, at the left end of armature 29', and a pilot valve seat; the pilot valve controls flow through passageway 56. The valve of FIG. 7 operates in substantially the same manner as the valve of FIG. 1.

A valve disk and holder assembly, according to this invention, for use with a valve of the type shown in FIG. 7 is illustrated in FIGS. 8–10. The assembly is identical to that shown in FIG. 2, and operates as described above with reference to that figure. Since in the valve of FIG. 7, no pilot passageway is present in the piston, top wall 34 of holder 33 is imperforate, i.e., has no hole corresponding to the hole 53 of FIGS. 4–6. In all other respects, disk 42 and holder 33 assembly shown in FIGS. 8–10 operates as described with reference to FIGS. 4–6. In particular, it will be noted, in FIG. 10, that disk 42 rises with holder 33 although no fasteners join them together.

It has been found desirable, as shown in FIG. 11, to form the disk 42' with an aspirator 58 projecting downwardly from its bottom face into orifice 14. Aspirator 58 effectively extends the lower end of hole 43 into a region of high velocity flow through orifice 14 when the valve is fully or partially open. As a result, greater lift forces are applied to the disk 42' by increasing the pressure differential across the disk.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A valve comprising:
   I. a valve body having an inlet port for connection to a source of pressurized fluid, an outlet port for connection to a region of lower pressure, an orifice between said ports, and a valve seat surrounding said orifice, and
   II. a valve disk and holder assembly movable toward and away from said valve seat, said assembly including:
      (a) a rigid inverted cup-like holder having a top wall, a side wall, and an open bottom,
      (b) a resilient disk, within said holder, having a top face facing the top wall of said holder and a bottom face exposed through the open bottom of said holder, said bottom face engaging said valve seat when the valve is closed,
      (c) said orifice and the portion of said disk bottom face inwardly of said valve seat when the valve is closed communicating with said outlet port and hence a low pressure region, and the portion of said disk bottom face outwardly of said valve seat when the valve is closed communicating with said inlet port and hence a high pressure region,
      (d) a hole in said disk extending between the top and bottom faces of said disk, and spaced from the periphery of said disk bottom face, for providing unobstructed communication between (i) the region between the top face of said disk and the top wall of said holder and (ii) the portion of the disk bottom face inwardly of said valve seat when the valve is closed, so that the region between the top face of said disk and the top wall of said holder communicates through said hole with said outlet port when the valve is closed, and
      (e) said valve disk and holder assembly being devoid of any means for fastening said disk and holder together.

2. A valve disk assembly as defined in claim 1 including sealing means for restricting flow of fluid from beneath the bottom face of said disk into the region between the top face of said disk and the top wall of said holder.

3. A valve disk assembly as defined in claim 2 wherein said sealing means comprises a peripheral lip carried by said disk and yieldable radially outwardly against the side wall of said holder in response to fluid pressure against the bottom face of said disk.

4. A valve disk assembly as defined in claim 3 wherein said peripheral lip is defined by a continuous groove in the bottom face of said disk.

5. A valve disk assembly as defined in claim 1 wherein the top wall of said holder is imperforate.

6. A valve disk assembly as defined in claim 1 wherein the top wall of said holder has a hole in alignment with the hole in said disk, a valve seat surrounding the hole in said top wall, and said aligned holes being devoid of any fastening means for joining said disk and holder together.

7. A valve disk assembly as defined in claim 1 wherein said disk is formed with an aspirator projecting downwardly from its bottom face, said hole extending through said aspirator.

* * * * *